(12) United States Patent
Carriere

(10) Patent No.: US 6,554,141 B2
(45) Date of Patent: Apr. 29, 2003

(54) DEVICE FOR FLOCCING A MIXTURE PRODUCED DURING OIL OR GAS WELL DRILLING

(76) Inventor: George Rodrigue Carriere, 110 Rice Dr., SE., Medicine Hat, Alberta (CA), T1B 3W8

( * ) Notice: Subject to any disclaimer, the term of this patent is extended or adjusted under 35 U.S.C. 154(b) by 0 days.

(21) Appl. No.: 09/846,226

(22) Filed: May 2, 2001

(65) Prior Publication Data

US 2002/0162793 A1 Nov. 7, 2002

(51) Int. Cl.⁷ .............................................. B01D 21/02
(52) U.S. Cl. ...................... 210/519; 210/521; 210/534
(58) Field of Search .................................. 210/519, 521, 210/532.1, 534, 535

(56) References Cited

U.S. PATENT DOCUMENTS

| | | | | |
|---|---|---|---|---|
| 826,580 A | * | 7/1906 | Keyes ........................... | 210/534 |
| 1,182,956 A | * | 5/1916 | Woolsey ...................... | 210/534 |
| 1,374,625 A | * | 4/1921 | Allen ........................... | 210/519 |
| 1,563,247 A | * | 11/1925 | Bruso et al. ................. | 210/534 |
| 1,847,864 A | * | 3/1932 | Cross .......................... | 210/535 |
| 2,281,590 A | * | 5/1942 | Newton ....................... | 210/534 |
| 2,799,645 A | * | 7/1957 | Musgrove .................... | 210/521 |
| 3,017,998 A | * | 1/1962 | Conley ........................ | 210/519 |
| 3,090,774 A | * | 5/1963 | Scoggin ...................... | 210/534 |
| 3,523,889 A | * | 8/1970 | E.is .............................. | 210/519 |
| 5,601,706 A | * | 2/1997 | Brenner ...................... | 210/534 |

FOREIGN PATENT DOCUMENTS

DE 508149 * 9/1930

* cited by examiner

Primary Examiner—Christopher Upton
(74) Attorney, Agent, or Firm—I. Zborovsky

(57) ABSTRACT

A device for floccing a mixture produced during oil or gas well drilling has a vertical tank with a vertical peripheral wall having a central axis, and a bottom located in a lower end of the peripheral wall, the tank having a height which is significantly greater than a cross-section of the tank, a line for introducing the mixture through a top end of the tank into an interior of the tank so that a solid fraction of the mixture settles on the bottom, and a line for withdrawing a liquid fraction of the mixture from the interior of the tank.

2 Claims, 1 Drawing Sheet

DEVICE FOR FLOCCING A MIXTURE PRODUCED DURING OIL OR GAS WELL DRILLING

BACKGROUND OF THE INVENTION

The present invention relates to a device for floccing a water-chemical mixture produced during oil or gas well drilling.

When drilling an oil or gas well, water and chemicals are circulated through the well to assist in the removal of mud, particulates and other purposes. It has been a challenge to clean this water/chemical mixture before pumping it down the wellhead. This process is referred to as "to floc or floccing".

It is known to use for floccing a very expensive centrifugal removal system, that removes suspended particulates through centrifugal force. Another known system includes a series of one, two or more horizontal settling type tanks. These tanks will allow the particulate to settle over a period of time. The tanks are usually squared in shape, and several tanks at times are necessary in sequence to sufficiently clean the fluid. Due to the square design, it is very difficult and dangerous to clean the tanks. A worker must enter the tank and shovel out the refuse that has settled.

SUMMARY OF THE INVENTION

Accordingly, it is an object of the present invention to provide a device for floccing a water-chemical mixture produced during oil or gas well drilling, which avoids the disadvantages of the prior art.

In keeping with these objects and with others which will become apparent hereinafter, one feature of present invention resides, briefly stated, in a device for floccing a water-chemical mixture produced during oil or gas well drilling, which has a tank with a substantially cylindrical vertical wall having a central axis, and a bottom located under said wall, wherein a vertical height of said tank is significantly larger than a horizontal cross-section of said tank; means for supplying a water-chemical mixture into said tank from a top of said tank into a tank interior, so that a solid fraction of the mixture settles on said bottom; and means for withdrawing a liquid fraction of the mixture from said tank.

When the device is designed in accordance with the present invention the vertical tank utilizes gravity, to compress solids which settle in the tank 5–6 times more than in a horizontal tank which is utilized in the prior art. The device is more economical and more environmental friendly. It uses less water because of squeezing action of the solids due to gravity and also it uses less chemicals because of less water being used. Also, less amount of solids volume being spread due to solids being more dense for land spreading. It also has less load to be hauled because one vertical tank will perform the action of two horizontal tanks. As solids are settled down in the tank during drilling of the well, the solids are allowed to pile up much higher than in the horizontal tanks. In turn, this allows the gravity to squeeze the water out of the settlings, making a much more dense flocced solids to be hauled to a spread field or to a sump location. The horizontal tank of the prior art uses 4–5 feet of floc compression, while the vertical floc tank in accordance with the present invention uses up to 20 feet of floc compression.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
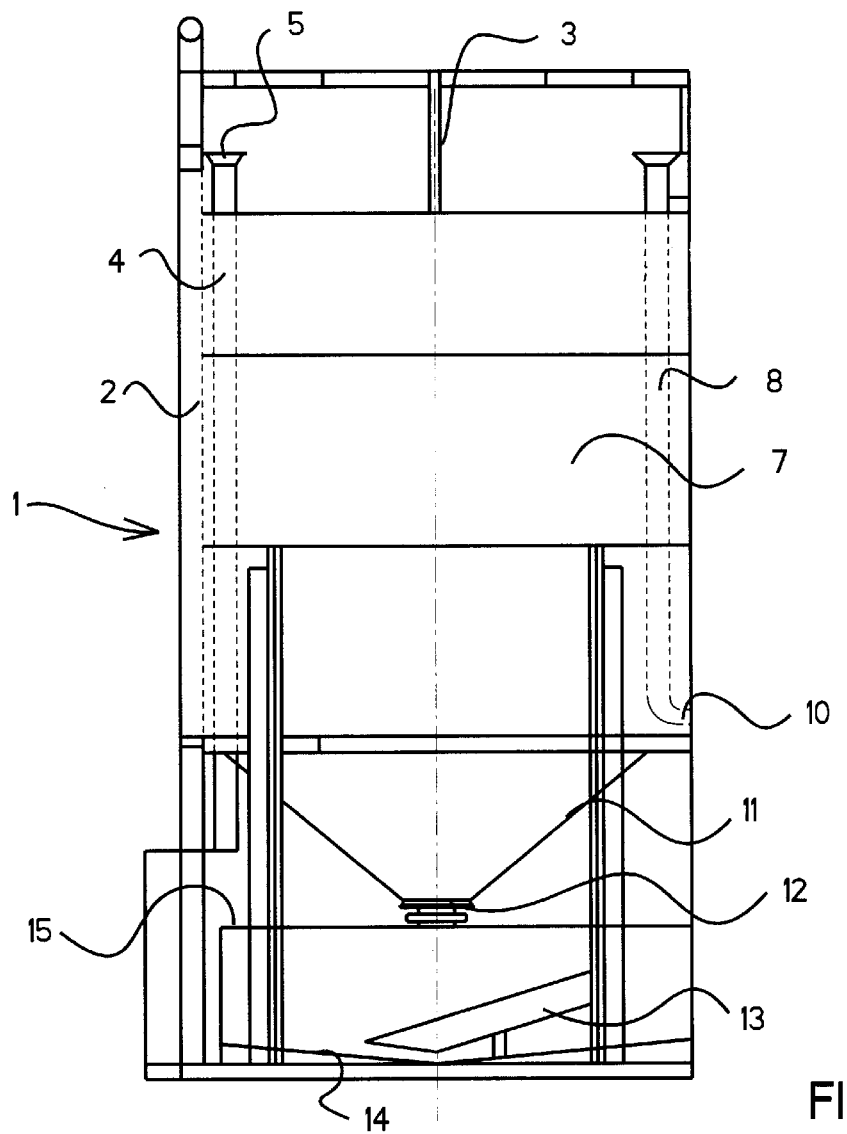
FIG. 1 is a vertical elevational view of a device for floccing a water-chemical mixture produced during oil or gas well drilling in accordance with the present invention.
Figure 2:
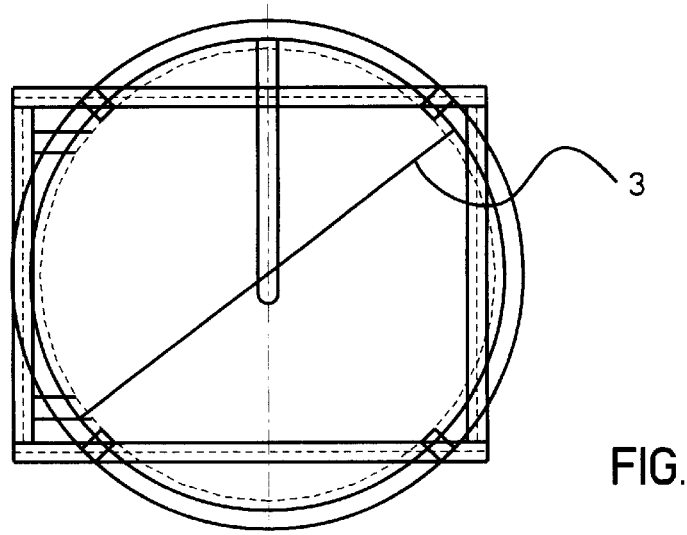
FIG. 2 is a top view of the device for floccing in accordance with the present invention.

A device for floccing a water-chemical mixture produced during oil or gas well drilling includes a tank which is identified as a whole with reference numeral 1. The tank is formed as a vertical tank and has a vertical wall which is identified with reference numeral 2. The wall 2 is substantially cylindrical and has a circular cross-section. The height of the wall 2 is significantly greater than diameter. For example the height of the vertical wall of the cylinder can be 1.5–2.5 times greater than the diameter of the wall.

The device further has a fill line which is identified with reference numeral 4. It carries the soiled water/chemical mix to the top of the tank and is spread with a spray cap. For this purpose a lower end of the fill line 4 is connected with the source of a mix, with the use of a lift pump while the upper end is introduced into a top of the tank 1. A baffle 3 is provided, to ensure that the fluid first travels downwards before exiting, so as to give the particulate or solid a sufficient time to settle as it moves through an area 7. The baffle 3 is preferably located substantially vertically along central vertical the axis of the tank.

The device further has an exit line which is identified with reference numeral 8. A clean fluid enters an inlet of the exit line 8 at the top, and exits the exit line 8 through its outlet located at the bottom end, to be cycled down a wellhead once again, for example through a return line 10.

The tank 1 is provided with a bottom 11 which can be formed as a conical bottom. A drain valve, for example a butterfly drain valve 12 is arranged in the bottom to facilitate periodic cleaning of the heavier particulate. A suction device is attached to a line 13 which is introduced into a lower chamber 14 of the tank 1. The butterfly drain valve 12 is opened and the suction device aspirates particulates through the line 13 from the chamber 14. Before introducing the fluid into the fill line, the fluid is first passed through a not shown screen, and larger particulate or flakes are removed and deposited directly into the chamber 14 through an opening 15 via a flow line from drilling rig. When the suction is applied through the suction line 13 by the suction device, the content of the chamber 14 is emptied, including the larger particulate that enters through the openings 15.

In order to clean a tank, a worker may stand above and clean it with a water hose, rather than entering the tank with a shovel as in the prior art.

It will be understood that each of the elements described above, or two or more together, may also find a useful application in other types of constructions differing from the types described above.

While the invention has been illustrated and described as embodied in a device for floccing water-chemical mixture produced during oil well drilling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A device for floccing a mixture produced during oil or gas well drilling, comprising a vertical tank having a central axis, a vertical peripheral wall extending around said central axis, a bottom located at a lower end of said peripheral wall, said tank having a height which is significantly greater than the cross-section of said tank; a fill line for introducing the mixture into an interior of said tank and extending substantially close to said peripheral wall at one side of said central axis, said fill line having a lower inlet connectable to a source of the mixture and an upper outlet so that the mixture travels upwards from said lower end to said upper end and then into the interior of said tank; an exit line extending substantially close to said peripheral wall at an opposite side of said central axis and having an upper inlet and a lower outlet so that a clean fluid flows through said exit line from said upper inlet to said lower outlet to be cycled down a wellhead; a baffle arranged in said tank and separating one part of said tank from another part of said tank so as to provide downward movement of the mixture before exiting, said baffle extending substantially vertically and being located substantially along said central axis in the middle of said tank, said fill line, said baffle, and said exit line extending vertically and substantially parallel to one another.

2. A device as defined in claim 1; and further comprising means forming a chamber located under said bottom, said bottom having an opening so that solids during cleaning can discharge through said outlet opening into said chamber; and means for withdrawing the solids and also the particulate and flakes from said chamber, said withdrawing means including a suction line having one end introduced into said chamber under said bottom and another end connectable to a suction device.

* * * * *